United States Patent
Blank

[15] 3,675,508
[45] July 11, 1972

[54] POWERSHIFT TRANSMISSION

[72] Inventor: Wallace J. Blank, Oshkosh, Wis.

[73] Assignee: Oshkosh Truck Corporation, Oshkosh, Wis.

[22] Filed: Sept. 4, 1970

[21] Appl. No.: 69,588

[52] U.S. Cl. .................................. 74/74.5, 74/357, 74/359, 74/360
[51] Int. Cl. ........................................ F16h 3/02, F16h 3/08
[58] Field of Search ............... 74/745, 357, 358, 359, 360, 74/361

[56] References Cited

UNITED STATES PATENTS

| | | | |
|---|---|---|---|
| 2,886,982 | 5/1959 | Thomas | 74/745 |
| 3,130,595 | 4/1964 | Cook | 74/359 X |
| 3,126,752 | 3/1964 | Bolster | 74/359 |
| 3,319,745 | 5/1967 | Hilpert | 74/360 X |
| 3,433,101 | 3/1969 | Scholl et al. | 74/866 |

*Primary Examiner*—Arthur T. McKeon
*Attorney*—Parker, Carter & Markey

[57] ABSTRACT

An eight speed vehicle transmission including a four speed main gear box and a two speed splitter gear box located on the input side of the four speed gear box. The four speed main gear box is detachable from the two speed splitter gear box for use with lighter weight vehicles. The transmission includes oil actuated multiple disk, power shift clutches for actuating constant mesh spur gears. The clutches are operated in sequentially selected combinations by means of hydraulic fluid under pressure regulated by solenoid operated pilot valves. The solenoids are operated by relays through means of a selector switch. The range shift in the four speed main transmission is obtained by the use of two single clutch packs on the third shaft is used for the low range torque with the torque with the torque multiplication taken on the output side of this clutch. The high range torque is handled by the single clutch pack on the fourth shaft. The output shaft of the main gear box has connections for rear and front axles. The output torque to the front axle is controlled by a torque limiter. Front axle drive disconnect means are also provided.

6 Claims, 6 Drawing Figures

| SPEED \ CLUTCH ENG | "A" | "B" | "C" | "D" | "E" | "F" | "G" |
|---|---|---|---|---|---|---|---|
| R1 |  | X | X |  |  | X |  |
| R2 | X |  | X |  |  | X |  |
| L1 |  | X |  |  | X | X |  |
| L2 | X |  |  |  | X | X |  |
| 3 |  | X |  | X |  | X |  |
| 4 | X |  |  | X |  | X |  |
| 5 |  | X |  |  | X |  | X |
| 6 | X |  |  |  | X |  | X |
| 7 |  | X |  | X |  |  | X |
| 8 | X |  |  | X |  |  | X |

INVENTOR.
Wallace J. Blank
BY Parker, Carter & Markey
Attorneys.

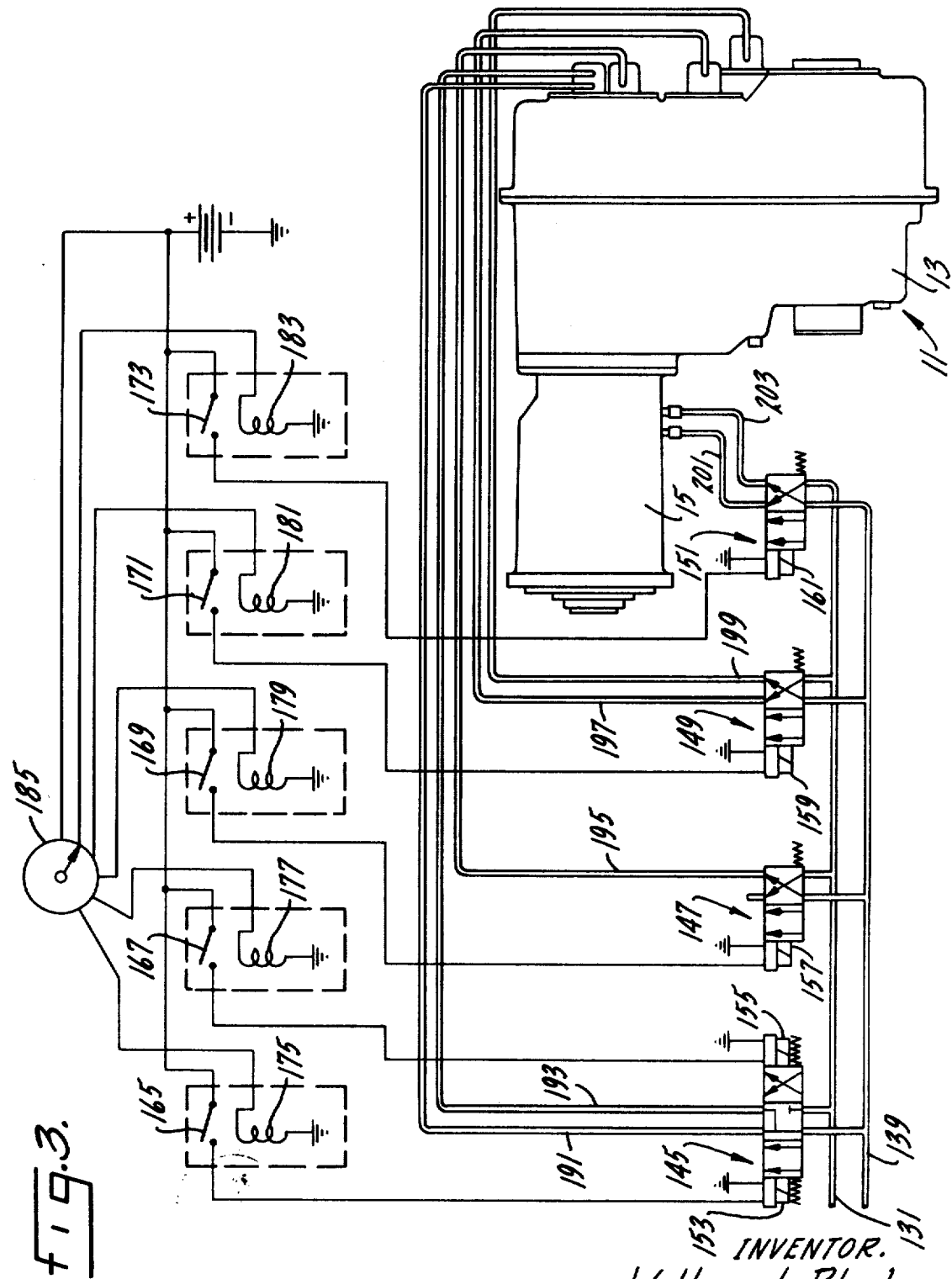

INVENTOR.
Wallace J. Blank
BY Parker, Carter & Markey
Attorneys.

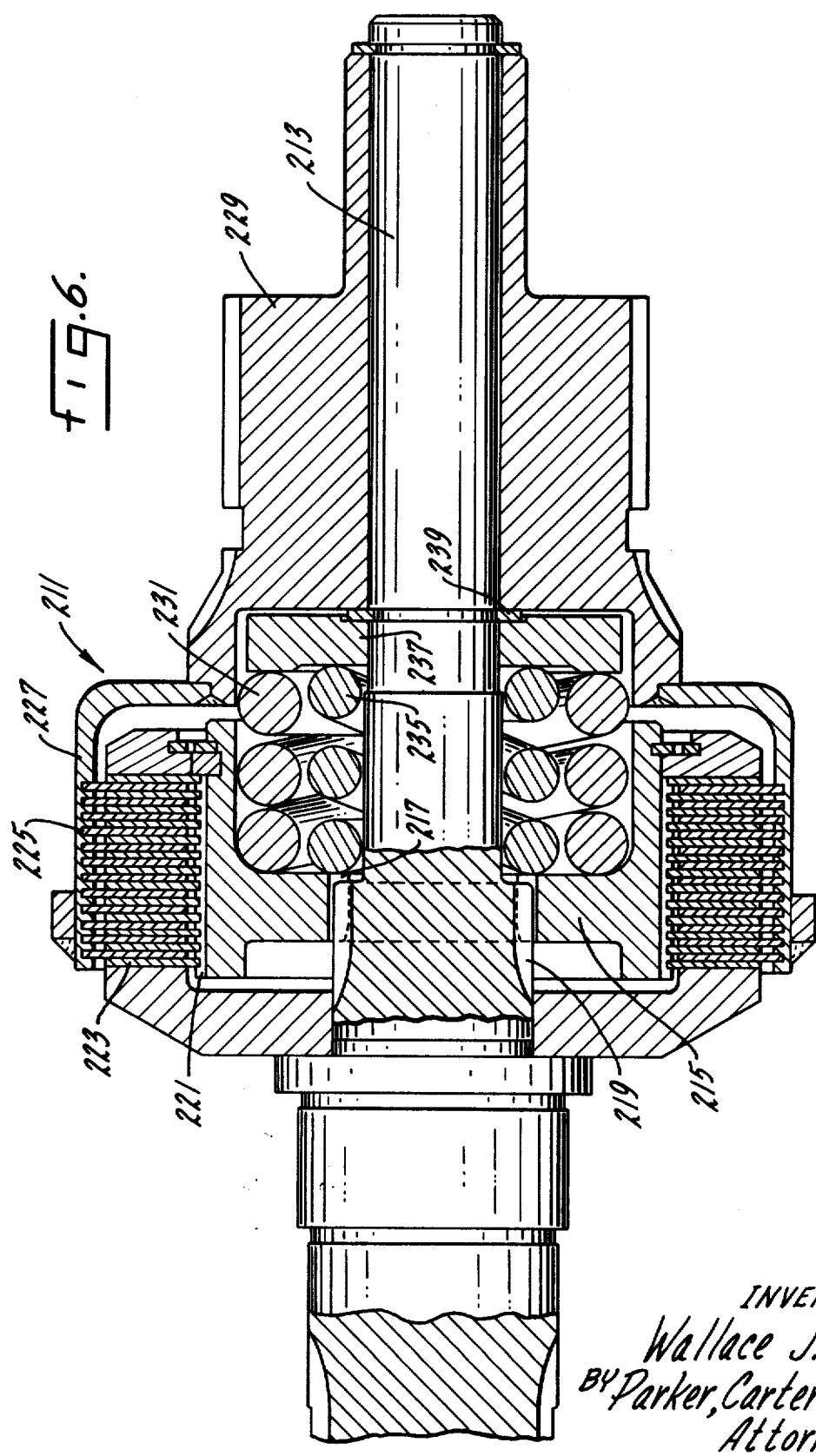

POWERSHIFT TRANSMISSION

SUMMARY OF THE INVENTION

This invention relates to a vehicle power transmission of the type having constant mesh spur gears located on parallel shafts in which the engagement of the gears is accomplished through the actuation of pressure operated multiple disk clutches. A variety of speed ratios between the input and output shafts of the transmission are obtained by energizing various combinations of the clutches.

An object of this invention is to provide a multiple speed transmission comprising a main transmission and an auxiliary transmission with the auxiliary transmission being detachable so that the main transmission may be used separately.

Another object is a transmission which may be adjusted for either high speed and low torque gasoline engines or low speed high torque diesel engines without changing the gear ratios or clutches of the main transmission.

Another object is a transmission which provides a sufficient range of gear ratios for use on heavy duty on-off highway trucks.

Another object is a drop case type countershaft transmission in which the power of the prime mover is transferred through the drop case to both the front and rear driving axles of the vehicle.

Another object is a transmission in which the torque delivered to the front driving axle of the vehicle may be limited to a predetermined amount.

Another object is a multi-speed transmission which extends a minimum distance above the input shaft of the transmission.

Another object is a multi-speed transmission of minimum size and weight.

Other objects may be found in the following specifications, claims and drawings.

BRIEF DESCRIPTION OF THE DRAWINGS

The invention is illustrated more or less diagrammatically in the following drawings wherein:

FIG. 3 is a schematic view of a portion of the electro-hydraulic control for actuating the clutches of the transmission of FIG. 1;

FIG. 6 is an enlarged, sectional view of a detail of the drive assembly of FIG. 5.

DESCRIPTION OF THE PREFERRED EMBODIMENTS

Figures 1, 2:
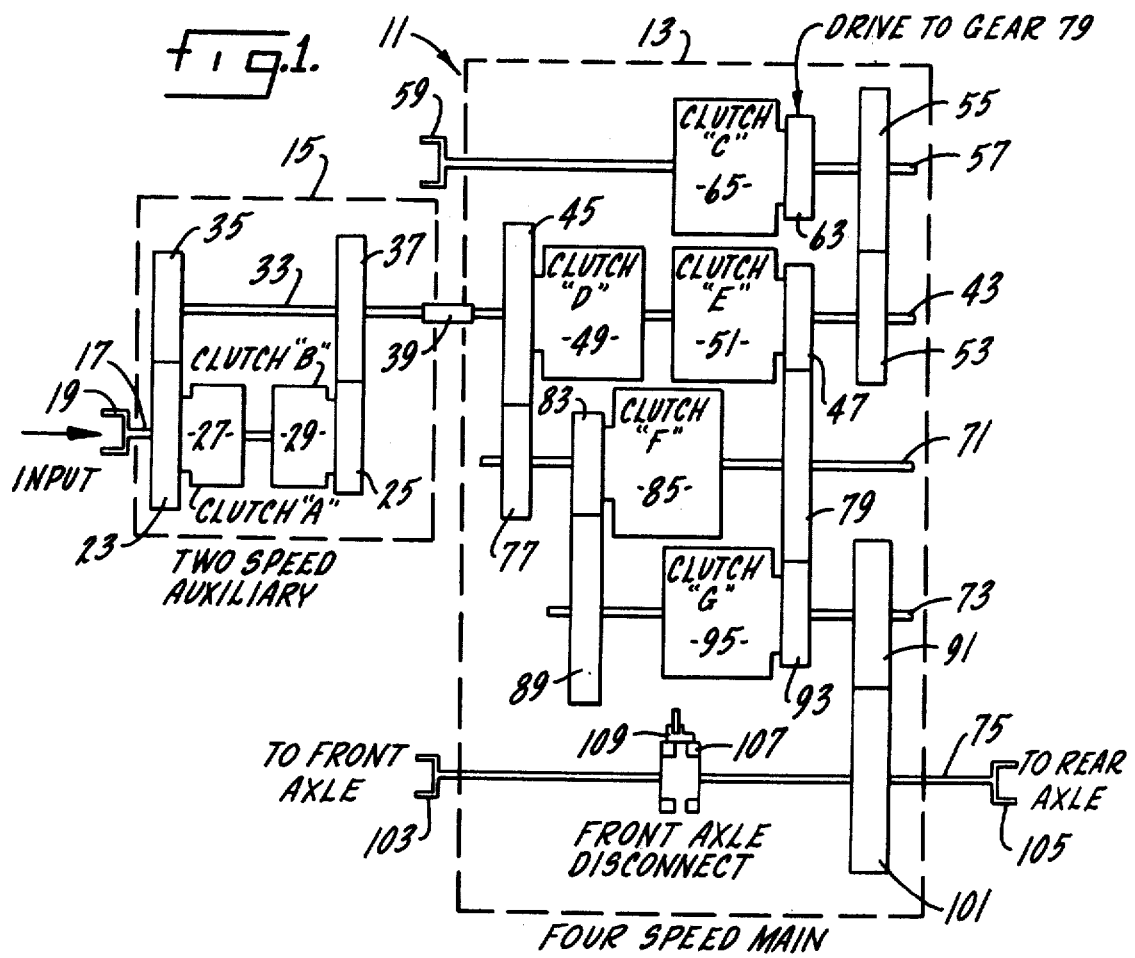
FIG. 1 is a schematic view of the two speed splitter and four speed main gear boxes of the transmission of this invention.
FIG. 2 is a chart showing the relationship between the engaged clutches and the various speeds of the transmission of FIG. 1.

The transmission 11 of this invention is shown schematically in FIG. 1. It includes a four speed main gear box 13 and a two speed auxiliary splitter gear box 15. The auxiliary gear box is connected to the input side of the main gear box. An input shaft 17 having an input connection 19 is mounted in the two speed gear box. The input connection 19 connects to a shaft (not shown) which connects to a prime mover (not shown). A torque converter or a master clutch is located between the input connection 19 and the prime mover, but since these are conventional, neither is shown.

Spur gears 23 and 25 of different diameters are mounted on input shaft 17 for rotation relative thereto. Clutches 27 and 29, also referred to as clutches A and B, are mounted on the shaft 17 and are actuatable to lock spur gears 23 and 25 to shaft 17. These clutches are of the oil actuated, oil cooled, multiple disk power shift type. Although two clutches are shown in FIG. 1 for clarity of illustration, normally a single duplex or double pack clutch would be used.

An output shaft 33 is also mounted in the auxiliary gear housing 15. Affixed to this shaft are spur gears 35 and 37 which mesh respectively with the spur gears 23 and 25 of the input shaft. The output shaft 33 is coupled at 39 to the input shaft 43 of the main gear box 13. Spur gears 45 and 47 are mounted on shaft 43 for rotation relative thereto. The spur gears are locked to the shaft 43 upon actuation of clutches 49 and 51, also referred to as clutches D and E. These clutches are also of the oil actuated, oil cooled, multiple disk power shift type. For clarity of illustration, clutches 49 and 51 are shown as separate clutches. However, normally a single, duplex or double pack clutch would be used.

A spur gear 53 is fixed to the input shaft 43. This gear meshes with spur gear 55 which is fixed to a reverse shaft 57 mounted in the main transmission case. The reverse shaft 57 has an input coupling 59 which is utilized when the main transmission gear box is used independently of the auxiliary gear box. A spur gear 63 is mounted on the reverse shaft 57 for rotation relative thereto. This gear is engaged with the reverse shaft 57 by means of a clutch 65, also identified as clutch C. This clutch is of the oil actuated, oil cooled, multiple disk, power shift, single pack type.

Third and fourth shafts 71 and 73 are mounted in the main gear box between the input shaft 43 and the output shaft 75. Spur gears 77 and 79 are affixed to the shaft 71 and mesh respectively with gears 45 and 47 of input shaft 43. Spur gear 63 of the reverse shaft 57 also meshes with spur gear 79.

A spur gear 83 is mounted on shaft 71 for rotation relative thereto and is locked to the shaft by clutch 85, also identified as clutch F. This clutch is also of the oil actuated, oil cooled, multiple disk power type and, in this instance, is a single pack clutch.

Spur gears 89 and 91 are affixed to the fourth shaft 73. Spur gear 89 meshes with clutch actuated spur gear 83 of shaft 71. A spur gear 93 is mounted on shaft 73 for rotation relative thereto. This gear may be locked to shaft 73 by means of clutch 95, also identified as clutch G. Clutch 95 is similar in construction to clutch 85 previously mentioned.

Spur gear 101 is affixed to output shaft 75 and meshes with spur gear 91 of shaft 73. The output shaft 75 is equipped with front axle connection 103 and rear axle connection 105. A front axle disconnect 107 is located on the output shaft 75 between the spur gear 101 and the front axle connection 103. A splined dog clutch 109 is provided to engage and disengage the front axle connection from the output shaft 75.

Figure 4:
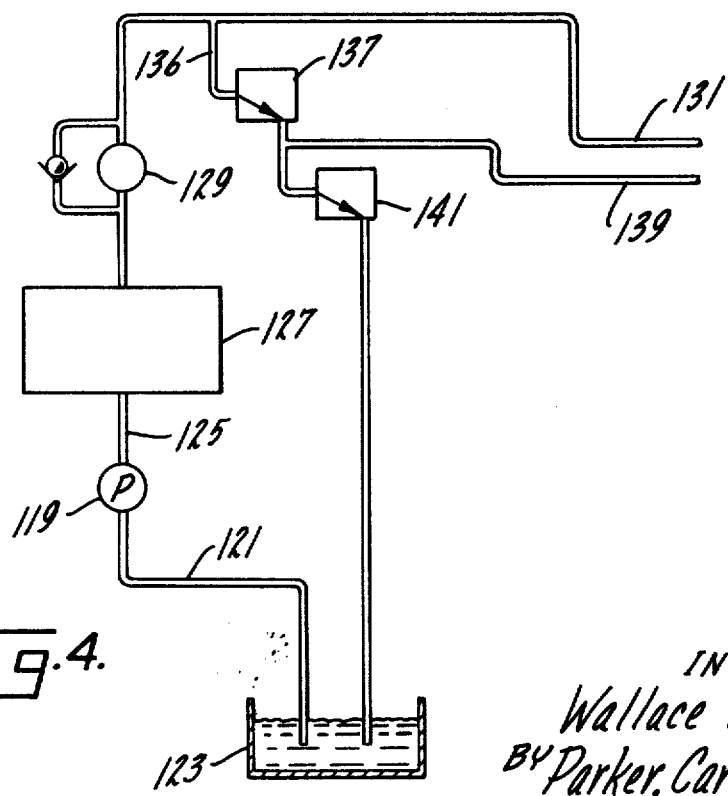
FIG. 4 is a schematic view of the remaining portion of the electro-hydraulic control for actuating the clutches of the transmission of FIG. 1.

The electro-hydraulic mechanism for operating the oil actuated clutches 27, 29, 49, 51, 65, 85 and 95, also identified as clutches A,B,C,D,E,F, and G, is shown in FIGS. 3 and 4 of the drawings. This system includes a pump 119 (FIG. 4) which is driven by the engine (not shown) of the vehicle. The pump takes suction through line 121 from the transmission housing well 123. The oil is pumped through line 125 to oil cooler 127. From the cooler, the oil is forced through a filter 129 and into a clutch application line 131.

A pressure regulator valve is located in a line 136 leading to the clutch application line 131. Regulator 137 is a pressure relief for line 131 and diverts oil into lubrication line 139. Regulator 141 is a pressure relief for the lubrication pressure line and returns the oil to the transmission housing well 123.

Referring now to FIG. 3, the clutch actuation oil pressure line 131 leads to solenoid operated spool valves 145, 147, 149 and 151. These valves are of the solenoid opening, spring closing type. Spool valve 145 is a double valve having solenoids 153 and 155 at the opposite ends thereof. Spool valves 147, 149 and 151 are controlled respectively by solenoids 157, 159 and 161. The solenoids are respectively controlled by switches 165, 167, 169, 171 and 173. Each switch is actuated by a relay with relays 175, 177, 179, 181 and 183 respectively operating switches 165, 167, 169, 171 and 173. The relays are selectively actuated by a rotary electric switch 185 which is mounted in the cab of the vehicle.

Spool valve 145 controls the operation of clutches 49 and 51 (clutches D and E) through hydraulic fluid lines 191 and 193 respectively. It should be noted that this pilot valve has a neutral position in which both clutches 49 and 51 are disengaged. Spool valve 147 controls the actuation of clutch 65 (clutch C), which is the reversing clutch, through hydraulic fluid line 195. Spool valve 149 controls the operation of clutches 85 and 95 (Clutches F and G) through hydraulic fluid lines 197 and 199 respectively. Spool valve 151 controls the actuation of clutches 27 and 29 (Clutches A and B) of the auxiliary transmission 15 through fluid lines 201 and 203 respectively.

Figure 5:
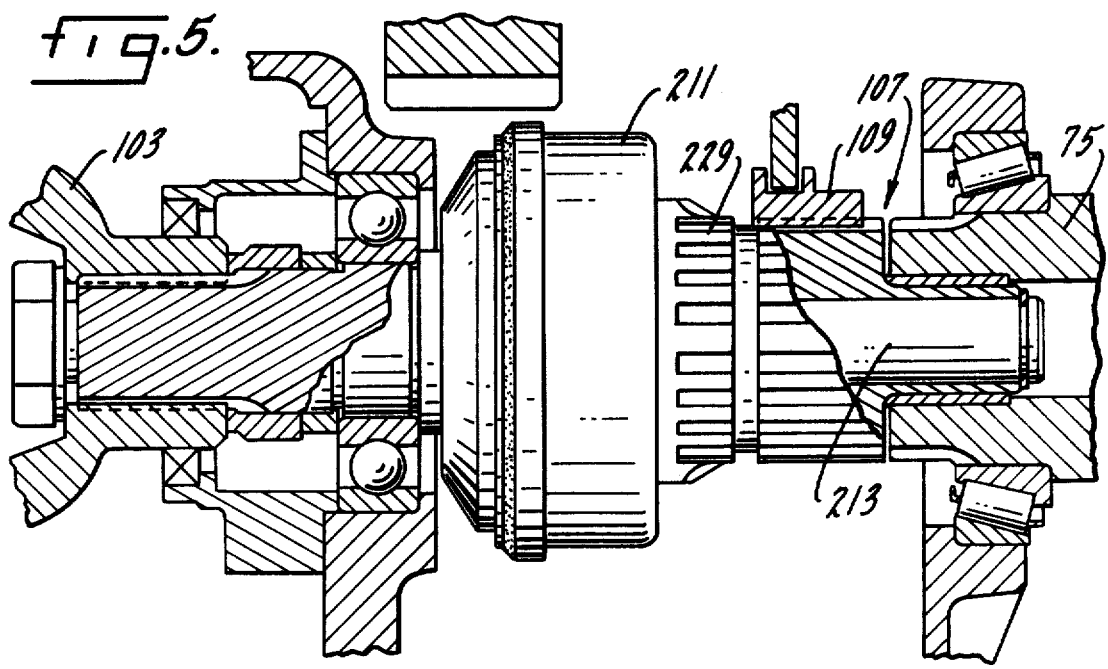
FIG. 5 is an enlarged, detailed elevational view of a portion of the transmission output shaft showing the front axle disconnect of FIG. 1.

FIG. 5 shows a portion of a modified main gear box output shaft. The modification includes the previously mentioned transmission output shaft 75 with the front axle drive disconnect 107 and the splined dog clutch 109. On the front axle drive side of the disconnect 107, a multiple disk slip clutch 211 is installed. This clutch, which, limits the amount of torque delivered to the front axle, is shown in detail in FIG. 6.

The slip clutch 211 is mounted on stub shaft 213 which extends between the front axle drive disconnect 107 and the front axle drive connection 103. A drum 215 fits over stub shaft 213 and has internal splines 217 which engage splines 219 of stub shaft 213. The drum has external splines 221 which engage and drive the internally splined pack of clutch disks 223. Externally splined clutch disks 225, which are located alternately between the clutch disks 223 are connected to a slotted drum 227 which is formed integrally with and is part of an externally splined hub 229 which fits over stub shaft 213 and is engaged by the dog clutch 109 (See FIG. 5).

Concentrically coiled springs 231 and 235 force drum 215 and its clutch disks 223 into contact with clutch disks 225. The axial load of these springs is proportional to the amount of torque the clutch is designed to transmit. The opposite ends of the springs bear against a spring retaining plate 237 which is secured to shaft 213 by means of a ring 239.

The use, operation and function of the invention are as follows:

The eight forward and two reverse speed transmission of this invention is intended for use on heavy duty vehicles of the type which operate both on and off highways. For example, this transmission may be used in 6 by 6 or 8 by 8 concrete trucks and similar vehicles. The four speed gear box may be used independently of the two speed auxiliary for lighter duty 4 by 4 snow plows and crash trucks where a transmission with a narrower range of input to output speed ratios may be sufficient.

It has been found that a minimum overall speed ratio range of 17 to 1 is needed for a transmission which is used to propel an on-off highway heavy duty truck such as a concrete carrier. Such vehicles have to maintain minimum highway speeds and at the same time be able to be manueverable in off the road conditions such as those existing at building sites.

A transmission with this range of speeds has been obtained through the use of a four speed main transmission gear box 13 in combination with a two speed splitter or auxiliary gear box located at the input to the four speed main transmission. The auxiliary gear box has two separate and distinct input-output speed ratios which may be used alternately in combination with the four forward and single reverse speed ratios of the main transmission housing to provide eight forward and two reverse speeds for the transmission. In other words, the auxiliary transmission provides two separate and distinct gear ratios for each of the four forward and one reverse gear ratios of the main transmission. Therefore, it is possible to adjust the input, output speed ratios of the transmission for different types of engines, such as a high speed and low torque gasoline engine or a low speed high torque diesel engine simply by changing the gear ratios in the auxiliary two speed transmission and without changing the gear ratios of the main transmission.

An additional advantage of locating the two speed auxiliary splitter gear box ahead of the main transmission gear box is obtained because the output shafts of all wheel drive transmission extend from the transmission both on the front and rear faces thereof. If the auxiliary transmission were located on the output side of the main transmission it would be necessary to provide an additional drop case after the auxiliary transmission to accommodate the front and rear output shafts.

A reduction in the size of the transmission has been achieved partially by utilization of single clutch packs on the so-called range clutches 85 and 95 (Clutches F and G). In conventional transmissions, the range clutches are normally located on one shaft and are in the form of a dual pack or duplex pack clutch. In this transmission, the range clutches are located on different shafts in order to reduce the torque handled by each clutch. A reduction in the torque handled by each clutch permits the reduction of the overall diameter and size of the clutch. This has been accomplished by taking the torque multiplication on the output side of the low speed, high torque range clutch 85 (Clutch F) by making the spur gear 89 with approximately twice the number of teeth as the clutch actuated spur gear 83. The high speed, low torque range is handled by clutch 95 (Clutch G). The clutch actuated spur gear 93 is formed with approximately half the number of teeth of the spur gear 79 affixed to the third shaft 71. As can be seen from the chart of FIG. 2, the clutch F (85) is used for the reverse and low forward speeds while the high speeds are handled by clutch G (95).

The dog clutch 109 which engages and disengages the front axle disconnect 107 may be power operated by a suitable control located in the cab of the vehicle. However, since this is conventional, it is not shown. The torque limiting slip clutch 211 is built with a predetermined slip torque capacity maintained by the compression springs 231 and 235 acting against the clutch disks 223 and 225. When the torque transmitted to the front axle exceeds the capacity of the springs, the clutch disks will disengage, thus protecting the front axle from excessive torque.

The driver of the vehicle operates the transmission through its range of speeds by means of the rotary switch 185 mounted in the cab of the vehicle. The driver, by turning the rotating rotary switch, can select any one of the eight forward speeds or the two reverse speeds. For example, if the driver turns the rotary switch 185 to the position for speed L 1, the solenoids 145, 149 and 151 will be moved to positions to energize hydraulic fluid lines 191, 197 and 201 which will actuate clutches 29, 51 and 85 (Clutches B, E and F). Other positions of the rotary switch will energize other combinations of clutches as indicated in the chart of FIG. 2.

It should be noted from the arrangement of the spool valves and solenoids that only one clutch of each group of clutches 27 and 29 (Clutches A and B) clutches 49 and 51 (Clutches D and E) and clutches 85 and 95 (Clutches F and G) can be operated in any one position of the rotary switch.

I claim:

1. A power transmission including:
 a four speed main gear box and a two speed splitter gear box with said two speed splitter gear box located at the input side of said main gear box,
 an input shaft and an output shaft mounted in said splitter gear box,
 a pair of clutch actuated spur gears in said splitter gear box journalled on said input shaft,
 spur gears affixed to said output shaft of said splitter gear box and meshing with said input shaft clutch actuated spur gears,
 said pairs of input and output shaft spur gears having different transmission ratios,
 an input shaft mounted in said four speed main gear box and connected to said output shaft of said two speed splitter gear box,
 a pair of clutch actuated spur gears in said main gear box journalled on said input shaft,
 a spur gear affixed to said input shaft,
 a reverse shaft mounted in said main gear box,
 a spur gear affixed to said reverse shaft and meshing with said fixed spur gear of said input shaft,
 a clutch actuated spur gear journalled on said reverse shaft, a third shaft mounted in said main gear box and having fixed spur gears meshing with said clutch actuated spur gears of said input shaft,
a clutch actuated spur gear journalled on said third shaft,
said clutch actuated spur gear of said reverse shaft meshing with one of said fixed spur gears of said third shaft,
a fourth shaft mounted in said main gear box,
a pair of spur gears affixed to said fourth shaft with one of said fixed spur gears meshing with said clutch actuated spur gear of said third shaft,
a clutch actuated spur gear journalled on said fourth shaft and meshing with one of said fixed spur gears of said third shaft,
an output shaft mounted in said main gear box,
a spur gear affixed to said output shaft and meshing with the other of said fixed spur gears of said fourth shaft, and
each of said clutch actuated spur gears being journalled on its respective shaft and locked to its shaft for rotation therewith upon actuation of its clutch,
means to selectively actuate said clutches to lock said spur gears with their respective shafts to vary the input-output speed ratio of the transmission.

2. The transmission of claim 1 further characterized in that the output shaft has output connections at its opposite ends and one of said output connections is selectively disconnectable from the remainder of the shaft.

3. The transmission of claim 1 further characterized in that the output shaft has output connections at its opposite ends and means are provided to limit the torque to one of said output connections.

4. The transmission of claim 1 further characterized in that said clutch actuated spur gear of said third shaft and said meshing spur gear of said fourth shaft are sized relative to each other to reduce the speed of and increase the torque of the fourth shaft relative to the third shaft.

5. The transmission of claim 1 further characterized in that said clutch actuated spur gear of said fourth shaft and said meshing spur gear of said third shaft are sized relative to each other to increase the speed of and reduce the torque of the fourth shaft relative to the third shaft.

6. A power transmission including:
a four speed gear box of the counter-shaft type having constant meshed gears mounted on parallel shafts,
an input shaft mounted in said four speed gear box,
a pair of clutch actuated spur gears journalled on said input shaft,
a spur gear affixed to said input shaft,
a reverse shaft mounted in said gear box,
a spur gear affixed to said reverse shaft and meshing with said fixed spur gear of said input shaft,
a clutch actuated spur gear journalled on said reverse shaft,
a third shaft mounted in said gear box and having fixed spur gears meshing with said clutch actuated spur gears of said input shaft,
a clutch actuated spur gear journalled on said third shaft,
said clutch actuated spur gear of said reverse shaft meshing with one of said fixed spur gears of said third shaft,
a fourth shaft mounted in said gear box,
a pair of spur gears affixed to said fourth shaft with one of said fixed spur gears meshing with said clutch actuated spur gear of said third shaft,
a clutch actuated spur gear journalled on said fourth shaft and meshing with one of said fixed spur gears of said third shaft,
an output shaft mounted in said gear box,
a spur gear affixed to said output shaft and meshing with the other of said fixed spur gears of said fourth shaft,
each of said clutch actuated spur gears being journalled on its respective shaft and locked to its shaft for rotation therewith upon actuation of its clutch, and
means to selectively actuate said clutches to lock said spur gears with their respective shafts to vary the input-output speed ratio of the transmission.

* * * * *